United States Patent
Hattori

(10) Patent No.: US 7,162,911 B2
(45) Date of Patent: Jan. 16, 2007

(54) SEMICONDUCTOR ACCELERATION SENSOR AND METHOD OF TESTING THE SAME

(75) Inventor: Kouji Hattori, Nagoya (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 10/868,905

(22) Filed: Jun. 17, 2004

(65) Prior Publication Data

US 2004/0255673 A1 Dec. 23, 2004

(30) Foreign Application Priority Data

Jun. 23, 2003 (JP) .............................. 2003-178152

(51) Int. Cl.
*G01P 21/00* (2006.01)
*G01R 31/26* (2006.01)

(52) U.S. Cl. ........................................ 73/1.38; 324/765

(58) Field of Classification Search ................. 73/1.38, 73/1.82, 1.86; 702/104, 116; 324/765
See application file for complete search history.

(56) References Cited

U.S. PATENT DOCUMENTS

| 4,283,952 | A | * | 8/1981 | Newman | .................. | 73/1.38 X |
| 4,620,446 | A | * | 11/1986 | Jensen et al. | ............. | 73/1.38 X |
| 5,070,843 | A | * | 12/1991 | Komurasaki | ............. | 73/1.38 X |
| 5,827,967 | A | * | 10/1998 | Ueyanagi et al. | ........ | 73/1.38 X |
| 5,866,796 | A | * | 2/1999 | Chia et al. | ................ | 73/1.38 X |
| 5,895,858 | A | * | 4/1999 | Malone et al. | ................ | 73/1.38 |
| 6,483,322 | B1 | | 11/2002 | Aoyama et al. | .......... | 73/514.32 |
| 6,859,700 | B1 | * | 2/2005 | Bolzmann et al. | ...... | 702/116 X |
| 6,894,482 | B1 | * | 5/2005 | Okada | ..................... | 324/158.1 |
| 7,042,228 | B1 | * | 5/2006 | Lally et al. | .............. | 73/1.38 X |
| 7,086,270 | B1 | * | 8/2006 | Weinberg et al. | ............ | 73/1.38 |

FOREIGN PATENT DOCUMENTS

| JP | A-60-119474 | 6/1985 |
| JP | A-08-310339 | 11/1996 |
| JP | A-10-232246 | 9/1998 |
| JP | A-11-2643 | 1/1999 |
| JP | A-11-271357 | 10/1999 |

OTHER PUBLICATIONS

Office Action from Japanese Patent Office issued on Jun. 27, 2006 for the corresponding Japanese patent application No. 2003-178152.
Office Action mailed on Oct. 10, 2006 issued from Japanese Patent Office for counterpart application No. 2003-178152. 2 pages in Japanese + 1 page translation.

* cited by examiner

*Primary Examiner*—Thomas P. Noland
(74) *Attorney, Agent, or Firm*—Posz Law Group, PLC

(57) ABSTRACT

Electrical characteristics of a semiconductor acceleration sensor containing a switched capacitor filter (15) are tested while the semiconductor acceleration sensor (1, 30, 50, 70, 90) is vibrated to apply a predetermined acceleration to the semiconductor acceleration sensor (1, 30, 50, 70, 90). The vibration frequency is fixed to a low frequency (for example, 50 Hz) at which the acceleration can be stably applied, and the characteristic of LPF is varied to plural kinds by a signal from an external testing apparatus (2, 40, 60, 80, 95). A sensor signal is received under each of the plural filter characteristics, and if these are within a predetermined specific range, the semiconductor acceleration sensor (1, 30, 50, 70, 90) is judged to be normal.

6 Claims, 12 Drawing Sheets

PATTERN 1

PATTERN 2

PATTERN 3

SW FREQ. & -3dB DROP FREQ. RELATIONSHIP

SEMICONDUCTOR ACCELERATION SENSOR AND METHOD OF TESTING THE SAME

CROSS REFERENCE TO RELATED APPLICATION

This application is based upon, claims the benefit of priority of, and incorporates by reference the contents of Japanese Patent Application No. 2003-178152 filed on Jun. 23, 2003.

FIELD OF THE INVENTION

The present invention relates to a semiconductor acceleration sensor having a semiconductor sensor element for outputting an electrical signal in connection with acceleration and a filter for extracting a predetermined frequency component from the electrical signal, the semiconductor sensor element and the filter being mounted in a package, and a method of testing the electrical characteristics of the semiconductor acceleration sensor during acceleration detection.

BACKGROUND OF THE INVENTION

Acceleration sensors have been hitherto used in various application fields. For example, when these acceleration sensors are applied to a vehicle field, they are used to detect acceleration under a travel state and perform various kinds of travel control such as ABS (Antilock Braking System), an air-bag system, etc. and body control, and to take safety measures, etc. for vehicles.

Semiconductor acceleration sensors which are relatively compact in size and that can be manufactured at a low cost have been mainly used as acceleration sensors mounted in vehicles. Particularly, there have been hitherto frequently used semiconductor acceleration sensors, each of which is designed so as to include a semiconductor sensor element for outputting an electrical signal in connection with acceleration and an amplifier for amplifying the electrical signal, the semiconductor sensor element and the amplifier being integrally mounted in a package.

Such a semiconductor acceleration sensor is subjected to various kinds of tests and calibration processing in a manufacturing process, and it is tested at the final stage of the manufacturing process whether it has predetermined electrical characteristics under acceleration-applied state. Specifically, a semiconductor acceleration sensor under the test is fixed on a vibrating table by a socket or the like, and the vibrating table is vibrated by a vibrating machine at a predetermined frequency to apply a constant acceleration to the semiconductor acceleration sensor for testing the various kinds of electrical characteristics (for example, see JP-A-10-232246, the contents of which are incorporated herein by reference).

Recently, high functionalization has been promoted for acceleration sensors, and acceleration sensors each of which is equipped with a low pass filter having a cut-off frequency of several hundred Hz (hereinafter referred to as "LPF") have been mass-produced. Specifically, such a semiconductor acceleration sensor 100 as shown in FIG. 14 is known. This semiconductor acceleration sensor 100 is designed so that a predetermined frequency component is extracted from an electrical signal output from a sensor element 111 through LPF 112 and then amplified by an amplifier to achieve a sensor output signal. Since LPF 112 is equipped in the acceleration sensor as described above, it has been required that the mechanical frequency characteristic of the sensor element 111 and the electrical frequency characteristic of LPF 112 are totally guaranteed as a sensor assembly (the overall semiconductor acceleration sensor 100).

In order to guarantee the electrical frequency characteristic of LPF 112 (hereinafter referred to merely as "frequency characteristic" unless otherwise specified), it is required to measure the sensor output signal in the above-described testing work using a vibrating machine while varying the vibration frequency to each of plural frequencies (that is, the frequency of the electrical signal from the sensor element 111 is varied to plural frequencies). That is, for example, the vibration frequency is varied to 50 Hz, 100 Hz, 200 Hz, 300 Hz, and 400 Hz, and the gain at each frequency is measured as shown in FIG. 15. In this case, if each measurement value is within a specified range at each frequency, it could be judged that the frequency characteristic is normal. FIG. 15 shows a frequency characteristic when the cut-off frequency of LPF 112 is equal to 400 Hz.

However, there is a time delay from the time when the semiconductor acceleration sensor 100 is vibrated at a predetermined vibration frequency by the vibrating machine to the time when the acceleration is stabilized. Therefore, when the semiconductor acceleration sensor is tested while the vibration frequency is varied to each of the plural frequencies as described above, much time must be taken for the testing work.

Furthermore, at a high vibration frequency (for example, not less than 200 Hz), the fixing state of the semiconductor acceleration sensor on the vibrating table through the socket or the like becomes unstable. Particularly, in the case of the testing system disclosed in JP-A-10-232246, the vibrating table is mounted on the vibrating machine by a spring. Therefore, when the vibrating table is vibrated at a high frequency, the acceleration is not well transferred to the sensor assembly, and thus it is difficult to test the frequency characteristic accurately.

Therefore, under the present condition, the semiconductor acceleration sensor is vibrated at a low frequency (for example, not more than 100 Hz) at which the acceleration can be stably applied by the vibrating machine, and the attenuation amount, the phase characteristic, etc. under this condition are measured. In this case, with respect to high-frequency components such as the cut-off frequency of LPF 112, etc., the sensor assembly is not actually vibrated, but only LPF 112 is tested as a single unit through a wafer test in the manufacturing process. Therefore, there is a problem in that the frequency characteristic test of the sensor assembly itself cannot be accurately carried out.

SUMMARY OF THE INVENTION

The present invention has been implemented in view of the foregoing problem, and has an object to enable an accurate test of the electrical characteristics of a semiconductor acceleration sensor having a filter therein.

In order to attain the above object, the inventor of this application has paid special attention to the fact that the frequency characteristic (output sensitivity) of the sensor element itself of the semiconductor acceleration sensor is generally substantially flat (0 dB) in a frequency range of 1 KHz or less as shown in FIG. 13, an area to be actually used in the above frequency range has a frequency range of about 500 Hz or less in most cases, and also low pass filters used as LPF 112 are designed so that the filter characteristics thereof are changeable, and reached the conclusion that a test equivalent to the frequency characteristic test of the related art can be implemented by setting the vibration frequency of the semiconductor acceleration sensor to a fixed value and observing a sensor signal for every filter characteristic while changing the characteristic of LPF.

That is, according to a first aspect of the present invention, there is provided a method of testing the electrical characteristics of a semiconductor acceleration sensor having a semiconductor sensor element for outputting an electrical signal in connection with acceleration, and a filter for passing components in a predetermined frequency band of the electrical signal, the semiconductor sensor element and the filter being mounted in a package. The filter constituting the semiconductor acceleration sensor is designed so that the filter characteristic thereof is set in accordance with a signal from the outside of the filter, and a signal passed through the filter is used as a sensor signal.

According to the first aspect of the present invention, under the state that the semiconductor acceleration sensor is vibrated at a preset vibration frequency to apply a predetermined acceleration to the semiconductor acceleration sensor, a characteristic setting signal which corresponds to a signal for setting the filter characteristic is changed to thereby change the filter characteristic to plural kinds of filter characteristics, and it is judged on the basis of the sensor signal of each of the plural kinds of filter characteristics whether the semiconductor acceleration sensor concerned is normal or not.

The semiconductor sensor element comprises a well-known sensor element which is designed so as to output the electrical signal corresponding to the acceleration (for example, the current, voltage or the like which is proportional to the acceleration) by using the property of the semiconductor, and the electrical signal from the semiconductor sensor element is output as a sensor signal through the filter to the outside of the sensor concerned.

The filter may be designed so that the electrical signal from the semiconductor sensor element can be directly input to the filter, or the electrical signal is subjected to level conversion by an amplifier or the like or subjected to various kinds of correction such as temperature correction, etc., and then input to the filter. Furthermore, the sensor signal output to the external is not limited to the signal passed through the filter, but it may be a signal which is output from the filter and then subjected to amplification by an amplifier or the like or to various kinds of correction such as temperature correction, etc., and then output to the outside of the filter.

It is assumed that the filter characteristic of the present invention contains at least the frequency characteristic of the attenuation amount (gain) in the electrical characteristics of the filter concerned. That is, the cut-off frequency of the filter can be freely set on the basis of the characteristic setting signal.

The vibration frequency of the semiconductor acceleration sensor when the semiconductor acceleration sensor is actually tested can be freely determined in a frequency range where a predetermined acceleration can be applied to the semiconductor acceleration sensor. It is preferable that the vibration frequency is set in a frequency range where acceleration can be stably applied by vibrating means (for example, the vibrating machine disclosed in JP-A-10-232246). Furthermore, the acceleration to be applied may be freely determined in an acceleration range which can be detected by the semiconductor acceleration sensor.

That is, the frequency characteristic test (for example, attenuation amount, phase) is not carried out by using the method of the related art described above in which the vibration frequency is varied and the sensor signal is taken in every vibration frequency. In place of the method of the related art described above, the vibration frequency is set to a fixed value, the characteristic setting signal is varied (that is, the filter characteristic is changed), and the output sensor signal under each filter characteristic at the fixed vibration frequency is taken in to achieve the same test effect as the method of the related art in which the vibration frequency is substantially varied.

Accordingly, according to the testing method of the first aspect of the present invention, the electrical characteristics of the semiconductor acceleration sensor containing the filter therein can be accurately tested without vibrating the semiconductor acceleration sensor at a high frequency at which it is difficult to stably apply the acceleration.

According to a second aspect of the present invention, there is provided a specific judging method based on the sensor signal which is taken in for each of the plural kinds of filter characteristics. That is, when the gain of the sensor signal under each filter characteristic is within a predetermined specified range containing a theoretical value of the gain of the sensor signal under the corresponding filter characteristic, the semiconductor acceleration sensor concerned is judged to be normal.

The gain of the sensor signal indicates the rate to the sensor signal when the attenuation amount caused by the filter is minimum (substantially zero). If the gain under each filter characteristic is within a corresponding predetermined specified range, it can be judged that the filter operates normally, and thus that the semiconductor acceleration sensor is normal as a whole.

Here, the plural kinds of filter characteristics can be arbitrarily determined. According to a third aspect of the present invention, there may be set at least two kinds of filter characteristics, that is, a first filter characteristic in which the attenuation amount of the vibration frequency component to the input signal is equal to substantially zero and a second filter characteristic in which the cut-off frequency is equal to the vibration frequency. If necessary, other filter characteristics than the two kinds of filter characteristics may be added.

According to the above construction, at least the attenuation characteristic to the frequency component which suffers a minimum effect of attenuation by the filter and the attenuation characteristic to the cut-off frequency component can be tested, so that the test can be efficiently carried out by setting the filter characteristic to the required minimum kind of filter characteristic.

In this case, more specifically, according to a fourth aspect of the present invention, the first filter characteristic may be set to the same filter characteristic set when the semiconductor acceleration sensor is actually used.

According to this setting, with respect to at least the electrical characteristics at low frequencies at which the acceleration can be stably applied to the semiconductor acceleration filter with little effect of the attenuation by the filter, they can be tested under an actual use state. Therefore, in addition to the effect achieved according to the third aspect of the present invention, the test can be performed with higher reliability.

Various specific methods for changing the filter characteristic to plural kinds may be considered. According to a fifth aspect of the present invention, an instruction for generating the characteristic setting signal corresponding to each of the plural kinds of filter characteristics is input from the external every characteristic setting signal, and the characteristic setting signal is generated in accordance with the instruction thus input.

According to a sixth aspect of the present invention, as another method, the plural kinds of filter characteristics may be successively generated by inputting an instruction from the external to successively generate the characteristic setting signals corresponding to the plural kinds of filter characteristics.

In the fifth aspect of the present invention, data indicating the filter characteristic (data indicating the type of the characteristic setting signal) may be used as the instruction from the external, or a voltage signal which is different in level in accordance with the type of the filter characteristic may be input as the instruction. Furthermore, the characteristic setting signal itself may be input as the instruction. At any rate, various instructing methods may be considered insofar as a desired filter characteristic can be achieved on the basis of the instruction from the external.

In the sixth aspect of the present invention, it may be considered that an instruction for starting the test is merely input from the external and the characteristic setting signal is successively varied in the semiconductor acceleration sensor by a sequence circuit, a program or the like. Furthermore, there may be considered a method in which the characteristic setting signal is varied in a preset order every time a fixed instruction is input from the external.

According to the testing methods of the fifth and sixth aspects of the present invention, various filter characteristics can be set by supplying an instruction from the external to the semiconductor acceleration sensor, and the test can be efficiently performed.

According to a seventh aspect of the present invention, there is provided a semiconductor acceleration sensor including a semiconductor sensor element for outputting an electrical signal in connection with acceleration, a filter whose filter characteristic is set in accordance with an input characteristic set signal, and a signal generating unit for generating a characteristic setting signal and outputting the characteristic setting signal thus generated to the filter, the semiconductor sensor element, the filter and the signal generating unit being mounted in a package and the electrical signal passed through the filter being output as a sensor signal to the external. The signal generating unit is designed so that the characteristic setting signal to be generated is changed in accordance with an instruction from the external.

According to the semiconductor acceleration sensor thus constructed, the electrical characteristics can be tested by using the testing method of the fifth aspect, and the same action and effect as the fifth aspect can be achieved.

Furthermore, according to an eighth aspect of the present invention, there is provided a semiconductor acceleration sensor including a semiconductor sensor element for outputting the electrical signal corresponding to the acceleration, a filter whose filter characteristic is set in accordance with an input characteristic setting signal, and a signal generating unit for generating a characteristic setting signal and outputting the characteristic setting signal thus generated to the filter, wherein the semiconductor sensor element, the filter and the signal generating unit are mounted in a package, and the electrical signal passed through the filter is output as a sensor signal to the outside of the semiconductor acceleration sensor. The signal generating unit is equipped with a sequence setting unit for generating plural kinds of characteristic setting signals in a preset order, and the signal generating unit generates the characteristic generating signal according to the operation of the sequence setting unit.

In this case, when the sequence setting unit is designed to be operated when an instruction for starting the test is supplied from the external, the method of the sixth aspect can be applied as the testing method. In this case, the same action and effect as the sixth aspect can be achieved. The sequence setting unit may be equipped separately from the signal generating unit, or it may be constructed as a part of the signal generating unit.

Various constructions may be adopted for the filter insofar as the filter characteristic of the filter can be arbitrarily set (changed) in accordance with the characteristic setting signal. For example, according to a ninth aspect of the present invention, a switched capacitor filter may be used. That is, according to a semiconductor acceleration sensor of the ninth aspect of the present invention, a switched capacitor filter comprising plural capacitors and a semiconductor switching element is applied as the filter. The switched capacitor filter is designed so that it is operated by turning on/off the semiconductor switching element and the filter characteristic thereof is varied in accordance with the switching frequency of the semiconductor switching element. Furthermore, as the characteristic setting signal, used is a pulse signal with which the semiconductor switching element is turned on/off at a predetermined switching frequency.

In general, the filter characteristic of the switched capacitor filter can be varied over a broad range by merely varying the frequency of the pulse signal (the switching frequency). Therefore, according to the semiconductor acceleration sensor thus constructed, a unit for changing the filter characteristic can be constructed relatively simply, and also the setting of the switching frequency (thus the setting of the filter characteristic) can be performed more flexibly.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

[First Embodiment]

Figure 1:
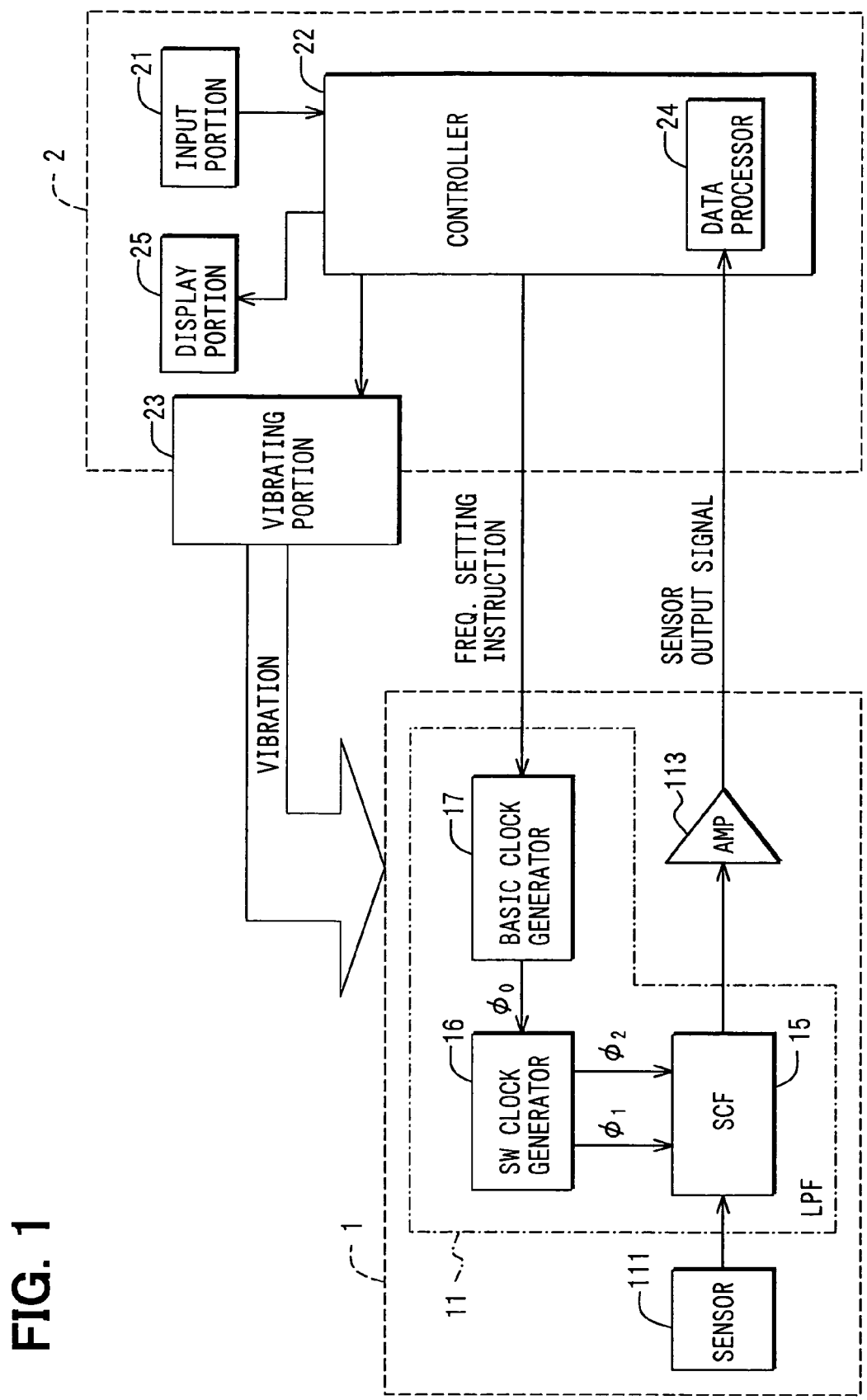
FIG. 1 is a block diagram showing the overall construction of a testing system according to a first embodiment of the present invention.

FIG. 1 is a diagram showing the overall construction of a testing system according to a first embodiment of the present invention. As shown in FIG. 1, the testing system according to this embodiment comprises a semiconductor acceleration sensor 1 as a test target, and a testing apparatus 2 for carrying out the test. The testing apparatus 2 is equipped with a vibrating portion 23, and the semiconductor acceleration sensor 1 is vibrated by the vibrating portion 23 to apply acceleration to the semiconductor acceleration sensor 1. Under this acceleration state, the testing apparatus 2 takes in a sensor signal from the semiconductor acceleration sensor 1 to carry out various kinds of tests.

The semiconductor acceleration sensor 1 comprises a sensor element 111 for outputting the electrical signal corresponding to the acceleration, LPF 11 for passing a predetermined frequency component of the electrical signal from the sensor element 111, and an amplifier 113 for amplifying the electrical signal passed through LPF 11, which are mounted in a package (not shown) such as a ceramic package or the like. The electrical signal amplified by the amplifier 113 is output as a sensor signal to the outside of the semiconductor acceleration sensor signal. When the semiconductor acceleration sensor 1 is vibrated by the vibrating portion 23, the electrical signal having the same frequency as the vibration frequency concerned is output from the sensor element 111.

Figure 14:
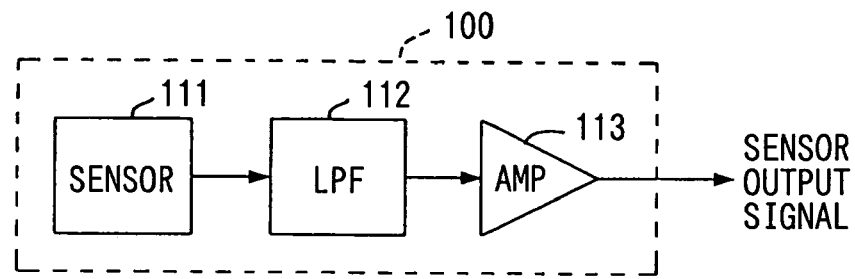
FIG. 14 is a block diagram showing the schematic construction of a related art semiconductor acceleration sensor.
Figure 15:
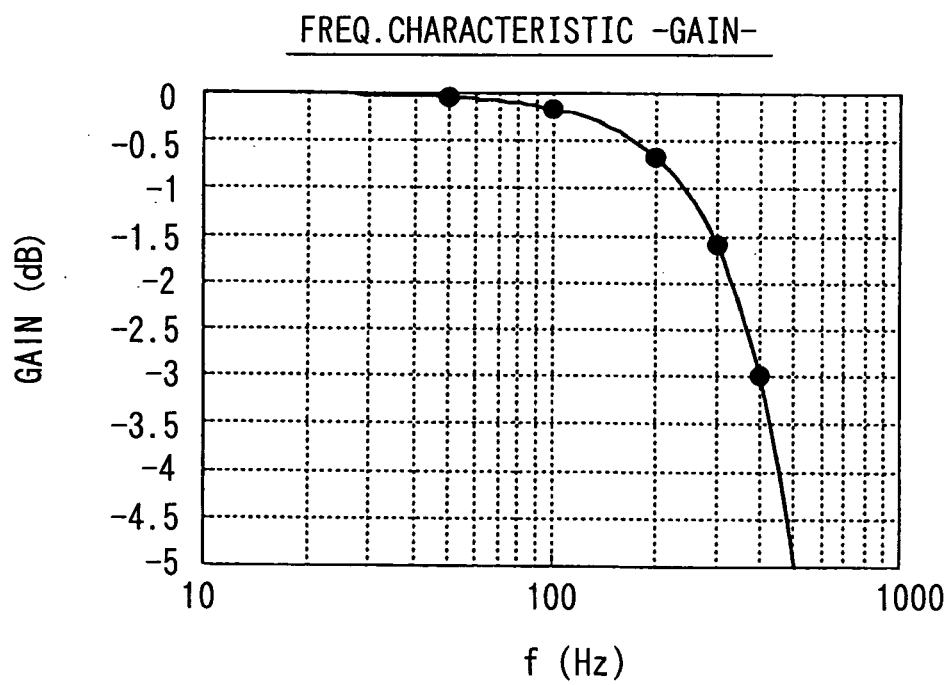
FIG. 15 is a graph showing the frequency characteristic (gain characteristic) of the related art semiconductor acceleration sensor.

The sensor element 111 and the amplifier 113 are designed to have the same constructions as those of the semiconductor acceleration sensor 100 shown in FIG. 14. The sensor element 111 is designed so that a movable portion is formed on a semiconductor substrate and an electrical signal is output in connection with a displacement of the movable portion due to acceleration (that is, the electrical signal corresponding to the acceleration; a voltage signal in this embodiment). Various detecting systems such as a piezo-resistance type, an electrostatic capacitance type, etc. can be applied.

LPF 11 comprises a switched capacitance filter (hereinafter referred to as "SCF") 15 whose filter characteristic is set in accordance with external switching clocks (hereinafter referred to as "SW clock") $\Phi_1$, $\Phi_2$, an SW clock generator 16 for generating the SW clocks $\Phi_1$, $\Phi_2$, and a basic clock generator 17 for generating a basic clock $\Phi_0$ which is required to generate the SW clocks $\Phi_1$, $\Phi_2$ by the SW clock generator.

The basic clock generator 17 is designed to have a general construction equipped with a quartz oscillator or the like to generate a predetermined basic clock $\Phi_0$. However, according to this embodiment, the basic clock generator 17 is designed so that the frequency of the basic clock $\Phi_0$ (basic clock frequency) thus generated is varied in accordance with a basic clock frequency setting instruction from the testing apparatus 2. The basic clock frequency setting instruction is the data indicating the frequency of the basic clock $\Phi_0$, and it corresponds to the instruction of the present invention (the fifth and seventh aspects).

When the semiconductor acceleration sensor 1 is actually mounted and used in a vehicle or the like, the cut-off frequency of SCF 15 is set to 400 Hz. That is, when it is actually used, LPF 11 functions as LPF having the pass frequency band of 400 Hz or less as a whole. Under the actual use state, no basic clock frequency setting instruction is input to the basic clock generator 17 and the input terminal thereof (not shown) is kept to an open state. Under this state, a basic clock $\Phi_0$ for setting SCF 15 to the above described filter characteristic (the cut-off frequency of 400 Hz) is output as a default from the basic clock generator 17.

The SW clock generator 16 is equipped with a frequency dividing circuit, etc., and generates the SW clocks $\Phi_1$, $\Phi_2$ from the basic clock $\Phi_0$. The respective circuit constants such as the frequency division ratio, etc. are fixed and thus the SW clocks $\Phi_1$, $\Phi_2$ are uniquely settled with respect to the input basic clock $\Phi_0$.

According to this embodiment, the basic clock frequency setting instruction is input from the testing apparatus 2 to the semiconductor acceleration sensor 1 at the testing stage to vary the basic clock frequency and thus change the filter characteristic (cut-off frequency or the like) of SCF 15 to plural kinds (described in detail later). The filter characteristic of SCF 15 and the filter characteristic of LPF 11 are synonymous with each other, and the filter characteristic of SCF 15 is also the filter characteristic of the overall LPF 11.

Figure 2:
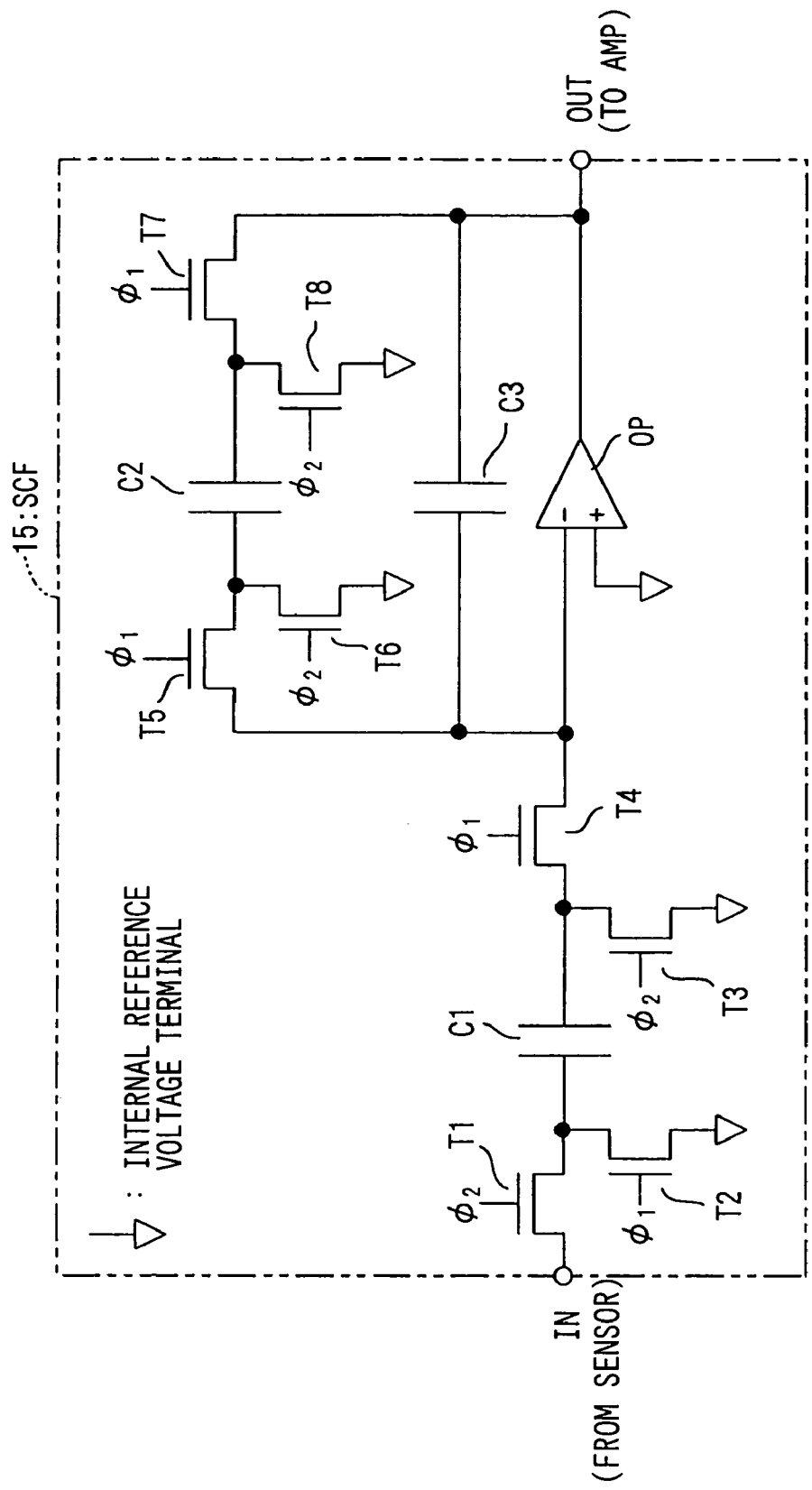
FIG. 2 is a circuit diagram showing the internal construction of a switched capacitor filter.

Specifically, SCF 15 is designed to have the construction as shown in FIG. 2. That is, a single variable resistor (hereinafter referred to as "first variable resistor") is equivalently constructed by a capacitor C1 and four transistors T1, T2, T3, T4 connected to the capacitor C1, and likewise a single variable resistor (hereinafter referred to as "second variable resistor") is equivalently constructed by a capacitor C2 and four transistors T5, T6, T7, T8 connected to the capacitor C2. Each of one end of the transistor T4 constituting the first variable resistor, one end of the transistor T5 constituting the second variable resistor and one end of the capacitor C3 is connected to the inverted input terminal of an operational amplifier OP, and the other end of the capacitor C3 is connected to the output terminal of the operational amplifier OP. One end of the transistor T7 constituting the second variable resistor is also connected to the output terminal of the operation amplifier OP.

Each of the transistors carries out the switching operation thereof on the basis of the SW clocks $\Phi_1$, $\Phi_2$, whereby each variable resistor functions as a resistor having the resistance value corresponding to the switching frequency (SW frequency) of the corresponding transistor. Therefore, the filter characteristic of SCF 15 is set in accordance with the SW frequency.

Figure 3A:
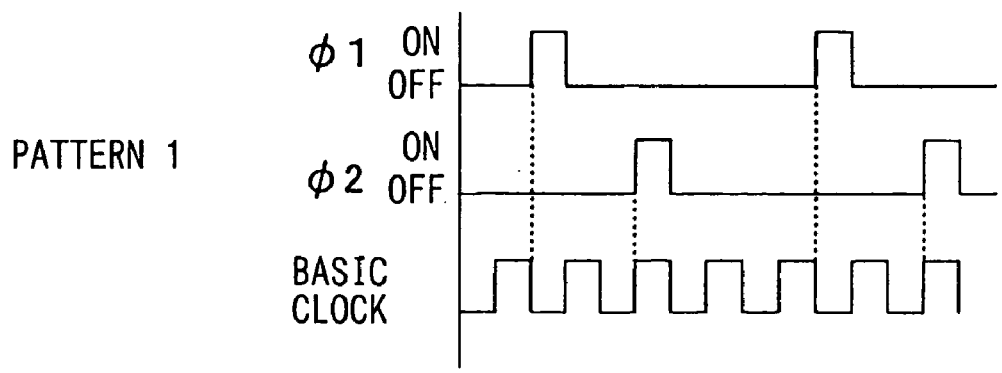
FIGS. 3A to 3C are diagrams showing a basic clock and a SW clock.
Figure 3B:
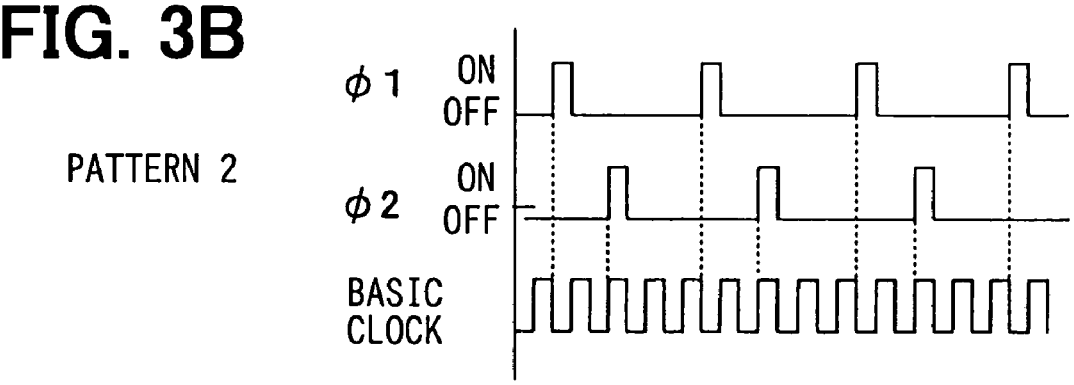
Figure 3C:
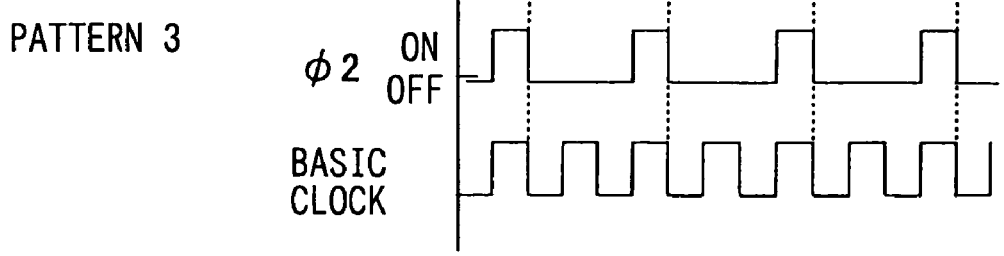

FIGS. 3A to 3C show examples of the basic clock $\Phi_0$ and the SW clocks $\Phi_1$, $\Phi_2$. A pattern 1 of FIG. 3A shows a state that two SW clocks $\Phi_1$, $\Phi_2$ are achieved by quartering the frequency of the basic clock $\Phi_0$ so that they are mutually displaced in phase by 0.75, [radians].

A pattern 2 of FIG. 3B shows a state that the SW frequency is doubled by doubling the basic clock frequency of the pattern 1, and a pattern 3 of FIG. 3C shows a state that the basic clock $\Phi_0$ is made invariable with respect to the pattern 1 and only the SW frequency is doubled.

Figure 4:
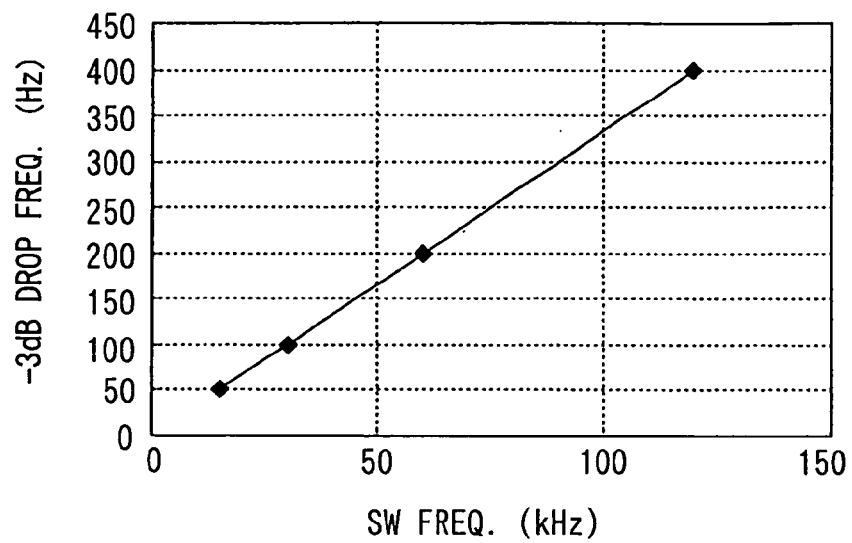
FIG. 4 is a graph showing the relationship between the SW frequency and the cut-off frequency (−3 dB drop frequency)

SCF 15 of FIG. 2 is designed so that the cut-off frequency (−3 dB drop frequency) is proportional to the SW frequency as shown in FIG. 4. Therefore, the cut-off frequencies in the case of the patterns 2, 3 in which the SW frequency is twice as high as that of the pattern 1 are twice as high as the cut-off frequency of the pattern 1.

Figure 5:
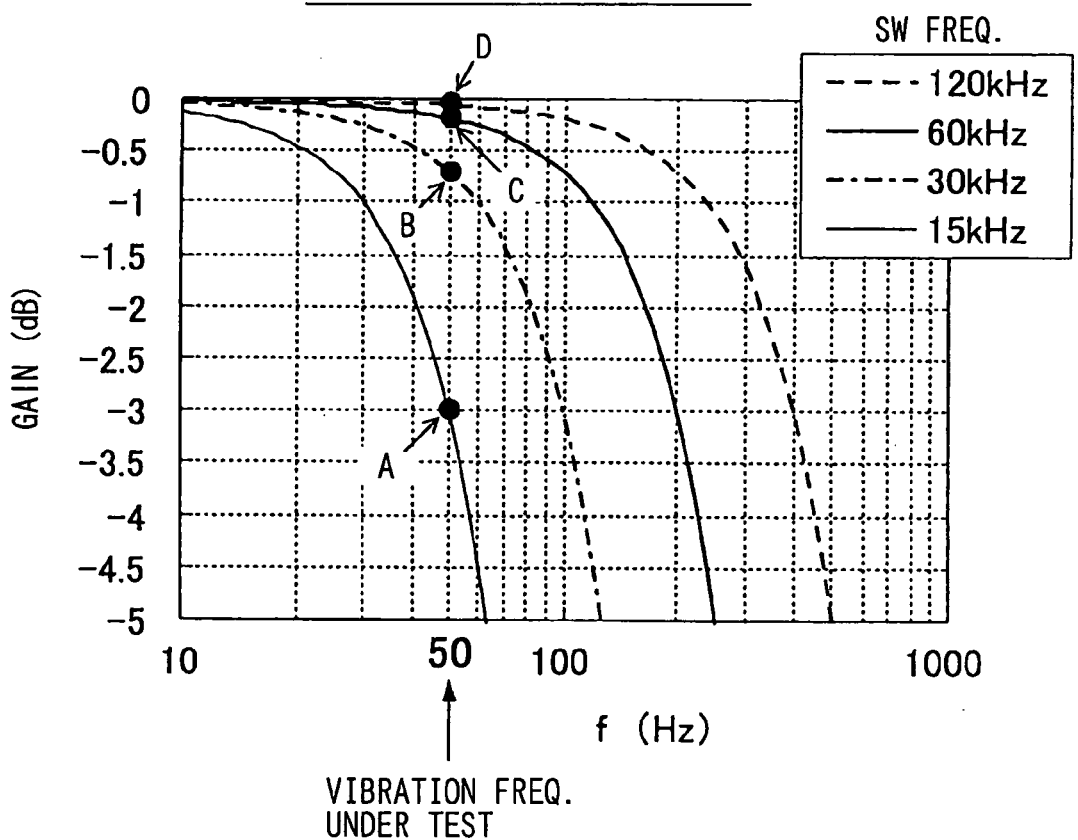
FIG. 5 is a graph showing the frequency characteristic (gain characteristic) of the semiconductor acceleration sensor according to the first embodiment.

Accordingly, for example when the filter characteristic in the case of the pattern 1 is assumed to be a characteristic (a curved line passing through a point A) indicated by a solid line (slender line) of FIG. 5, the filter characteristic in the case of the patterns 2, 3 in which the SW frequency is twice as high as that of the pattern 1 becomes a characteristic (a curved line passing through a point B) indicated by a chain line of FIG. 5. Paying attention to the cut-off frequency at which the gain is equal to −3 dB, the cut-off frequency in the case of the pattern 1 is equal to 50 Hz, however, the cut-off frequency in the case of the patterns 2, 3 in which the SW frequency is twice is equal to 100 Hz.

In this embodiment, when the SW frequency is set to 120 KHz, the filter characteristic becomes a characteristic (a curved line passing through a point D) indicated by a broken line of FIG. 5 and the cut-off frequency is equal to 400 Hz. When the SW frequency is set to 60 KHz, the filter characteristic becomes a characteristic (a curved line passing through a point C) indicated by a solid line (heavy line) of FIG. 5, and the cut-off frequency is equal to 200 Hz. When the SW frequency is set to 30 KHz, the filter characteristic becomes a characteristic (a curved line passing through a point B) indicated by a chain line of FIG. 5, and the cut-off frequency is equal to 100 Hz. When the SW frequency is set to 15 KHz, the filter characteristic becomes a characteristic (a curved line passing through the point A) indicated by the solid line (slender line) of FIG. 5, and the cut-off frequency is equal to 50 Hz. When the test is actually is carried out, the SW frequency is varied to the four frequencies described above and the gain at each frequency is measured.

The testing apparatus 2 comprises an input portion 21 for accepting an input of various kinds of setting data, parameters, etc. required for the test, a display portion 25 for displaying the input content to the input portion 21, the test progress condition/test results, etc., a vibrating portion 23 for vibrating the semiconductor acceleration sensor 1, and a controller 22 for executing the test according to the content input to the input portion 21 and performing the overall control of the testing apparatus 2 such as the control of the vibrating portion 23 and the display portion 25, etc.

The vibrating portion 23 is omitted from the illustration, but it is actually constructed by a vibrating table for fixing the semiconductor acceleration sensor 1 and a vibrating apparatus for vibrating the vibrating table at a predetermined vibration frequency. The vibrating portion 23 vibrates the vibrating table at the vibration frequency corresponding to an instruction from the controller 22 (that is, the semiconductor acceleration sensor 1 is vibrated). A sensor signal from the semiconductor acceleration sensor 1 is taken into a data processor 24 in the controller 22 to perform various kinds of analysis/judgment, etc.

In the testing system of this embodiment thus constructed, the vibrating portion 23 vibrates the semiconductor acceleration sensor 1 at a predetermined vibration frequency to apply a fixed acceleration to the semiconductor acceleration sensor 1. The vibration frequency may be set to any frequency insofar as it can apply acceleration to the semiconductor acceleration sensor 1 stably. In this embodiment, the vibration frequency is set to 50 Hz, for example. Furthermore, the basic clock frequency setting instruction is input from the testing apparatus 2 to the semiconductor acceleration sensor 1 (in detail, the basic clock generator 17), and also the basic clock frequency setting instruction is varied so that the filter characteristic of SCF 15 is changed to plural kinds. Under this state, it is judged on the basis of the sensor signal output under each filter characteristic whether the semiconductor acceleration sensor 1 is normal or not.

In this embodiment, the four kinds of filter characteristics of SCF 15 are set by inputting four kinds of basic clock frequency setting instructions. Specifically, these four kinds of instructions contain an instruction for setting the SW frequency to 120 KHz and setting the cut-off frequency of SCF 15 to 400 Hz, an instruction for setting the SW frequency to 60 KHz and setting the cut-off frequency of SCF 15 to 200 Hz, an instruction for setting the SW frequency to 30 KHz and setting the cut-off frequency of SCF 15 to 100 Hz, and an instruction for setting the SW frequency to 15 KHz and setting the cut-off frequency of SCF 15 to 50 Hz. Out of the four kinds of filter characteristics, the filter characteristic in which the cut-off frequency is equal to 400 Hz corresponds to the first filter characteristic of the present invention, and the filter characteristic in which the cut-off frequency is equal to the vibration frequency, that is, 50 Hz, corresponds to the second filter characteristic of the present invention.

The gain of the sensor signal is measured every basic clock frequency setting instruction (every filter characteristic), and if all the gains thus measured are within a specified range, the semiconductor acceleration sensor is judged to be normal. That is, for example, when the basic clock frequency setting instruction for setting the SW frequency to 15 KHz (setting the cut-off frequency to 50 Hz) is input under the state that the semiconductor acceleration sensor is vibrated at the vibration frequency of 50 Hz, the gain of the sensor signal should be theoretically equal to −3 dB. Accordingly, if the gain (the point A of FIG. 5) of the sensor signal measured at this time is located within a specified range with a slight permissible amount (for example, ±0.1 dB) from −3 dB, the semiconductor acceleration sensor is judged to be normal with respect to the filter characteristic concerned for the moment.

Likewise, the SW frequency is varied to 120 KHz, 60 KHz, 30 KHz on the basis of the basic clock frequency setting instruction to set the filter characteristic corresponding to each SW frequency, and sensor signals in the respective cases are achieved. Then, it is judged whether the gain of each sensor signal (the points D, C, B of FIG. 5) is within a predetermined specified range (for example, theoretical value ±0.1 dB) containing a theoretical gain of each sensor signal (a gain estimated on design) in the filter characteristic concerned. As a result, if the gains are within the specific range in all the four kinds of filter characteristics, the semiconductor acceleration sensor 1 is judged to be normal.

Figure 6:
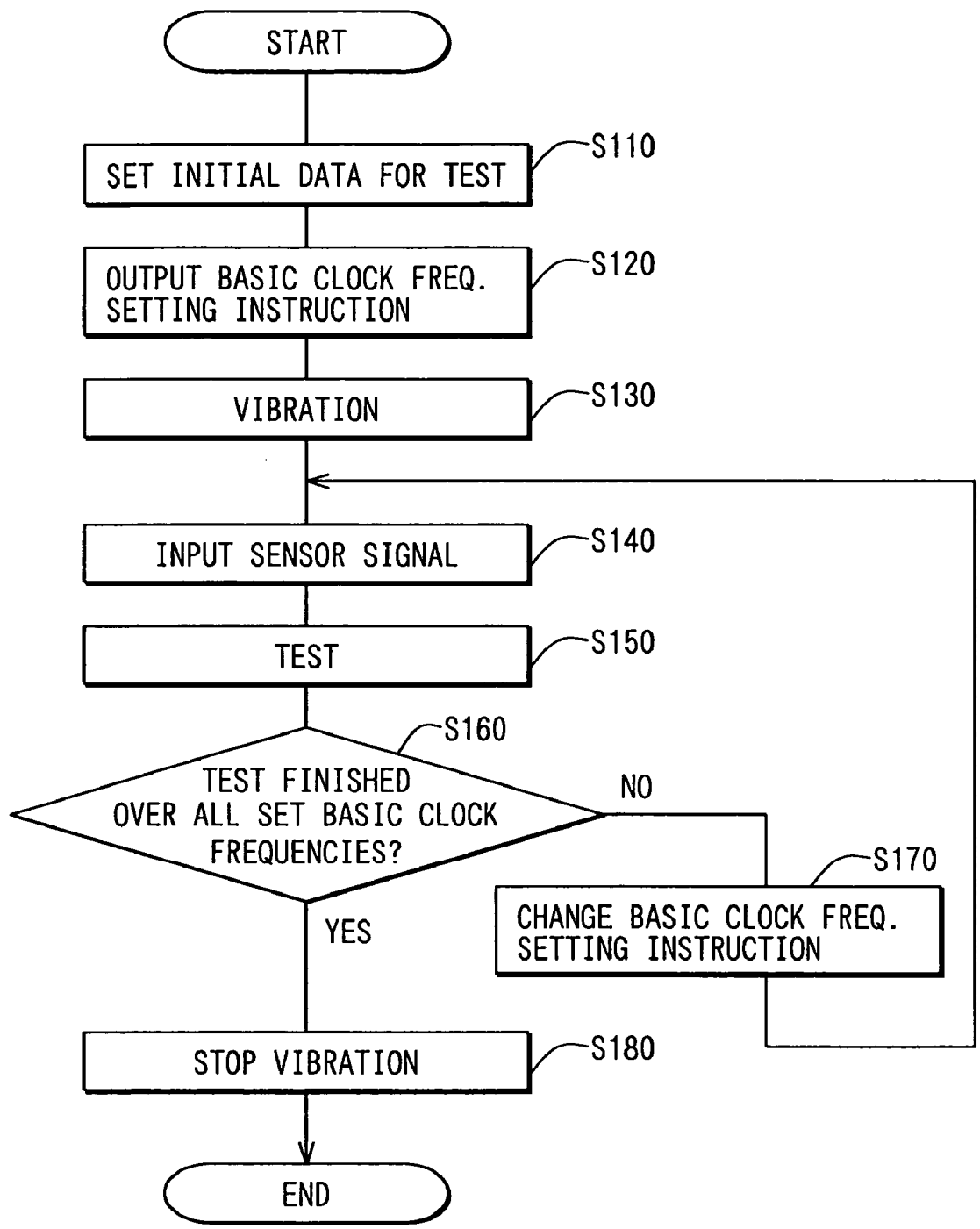
FIG. 6 is a flowchart showing the test control processing according to the first embodiment.
Figure 7:
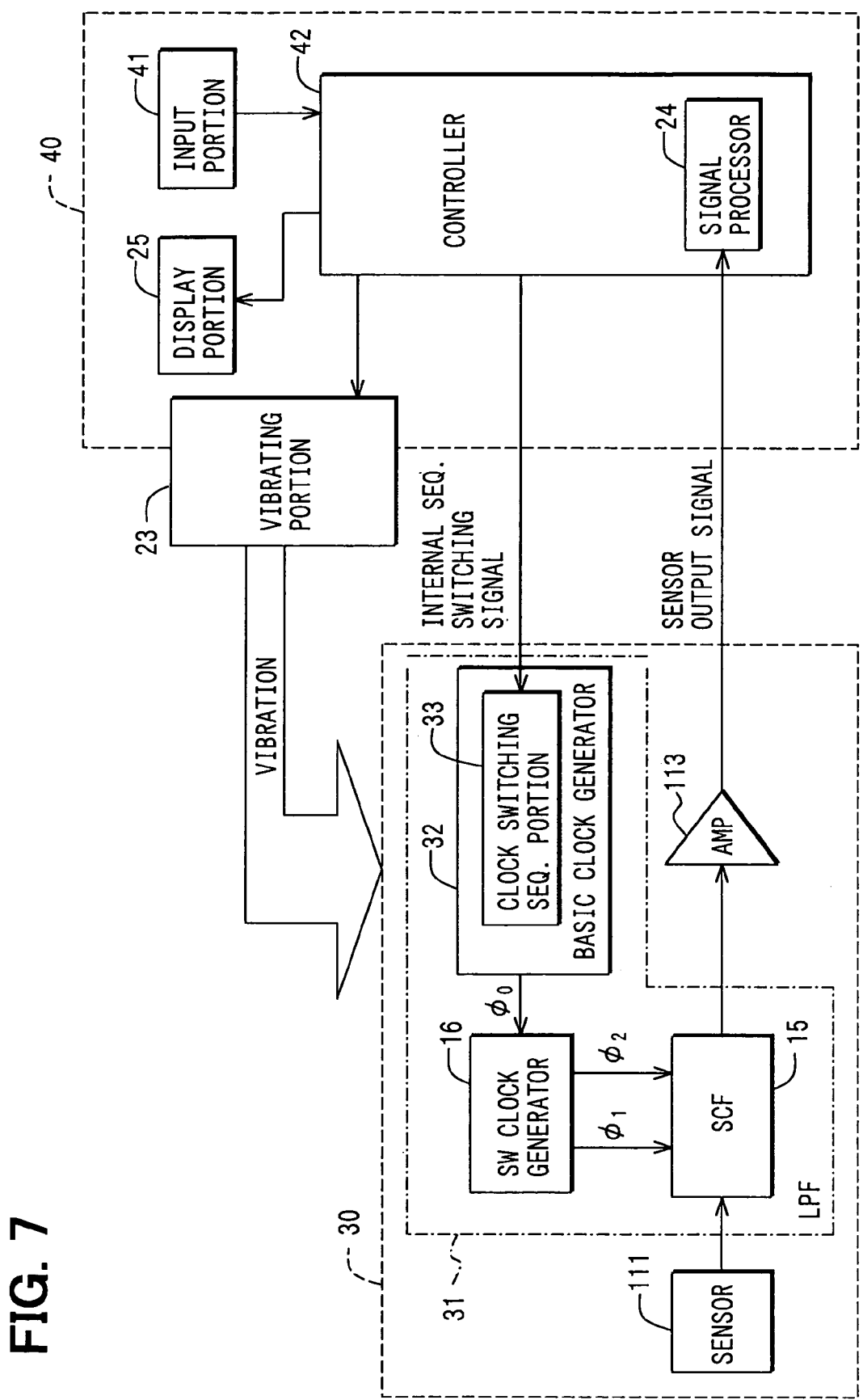
FIG. 7 is a diagram showing the overall construction of a testing system according to a second embodiment of the present invention.

Next, the operation of the testing apparatus 2, that is, the operation of inputting the basic clock frequency setting instruction to the semiconductor acceleration sensor 1 to be tested and carrying out the various kinds of processing/judgment on the basis of the sensor signal under each filter characteristic will be described with reference to FIG. 6. FIG. 6 is a flowchart showing the test control processing executed by the controller 22.

When initial data such as the acceleration to be applied, the vibration frequency, the types of the basic clock frequency setting instructions (in other words, the kinds of the filter characteristics), etc. which are required for the test are input to the input portion 21, thereby starting this processing. First, in step S110, various kinds of initialization such as preparation of output of the basic clock frequency setting instruction, preparation of the operation of the vibrating portion 23/data processor 24, etc. are carried out on the basis of the input initial data.

In subsequent step S120, the basic clock frequency setting instruction is output to the semiconductor acceleration sensor 1, and in step S130 the semiconductor acceleration sensor 1 is vibrated at 50 Hz, whereby the acceleration set as the initial data described above is applied to the semiconductor acceleration sensor 1. In this embodiment, the basic clock frequency setting instruction for setting the SW frequency to 120 KHz (the cut-off frequency is set to 400 Hz) is output in the first processing of S120. More specifically, the data indicating the frequency of the basic clock required to set the SW frequency to 120 KHz is output.

Thereafter, in step S140 the sensor signal is taken in, and in S150 the test based on the sensor signal is carried out. Specifically, as described above, the judgment is made on the basis of a judgment as to whether the gain of the sensor signal is within the specific range. It is judged in S160 whether the test has been carried out over all the basic clock frequencies thus set (that is, all the filter characteristics to be tested), and if this judgment is positive, the processing goes to step S180 to stop the vibration of the semiconductor acceleration sensor and finish the test.

On the other hand, if there exists any basic clock frequency to be tested, the processing goes to S170 to change the basic clock frequency setting instruction, so that the basic clock frequency is varied and the SW frequency is varied (the filter characteristic is changed). That is, if the test has been carried out in only the case where the SW frequency is equal to 120 KHz, in S170 the basic clock frequency setting instruction for varying the SW frequency to 60 KHz is output. After the processing of S170, the processing returns to S140, and the same processing is repeated until the test has been carried out on all the filter characteristics thus set.

As described above, according to this embodiment, the frequency characteristic is not tested by varying the vibration frequency of the semiconductor acceleration sensor 1 like the related art, but the vibration frequency is fixed, instead, the SW frequency is varied to set the filter characteristic of SCF 15 to plural kinds, and the test is carried out on the basis of the sensor signal under each filter characteristic.

Accordingly, it is substantially confirmed that if the gain of the sensor signal measured by actually vibrating the semiconductor acceleration sensor at 50 Hz is equal to −3 dB as theoretically estimated when the filter characteristic is set so that the gain is theoretically equal to −3 dB at 50 Hz, for example, the gain of the sensor signal measured by actually vibrating the semiconductor acceleration sensor at 400 Hz is equal to −3 dB even when the filter characteristic is set so that the gain is equal to −3 dB at 400 Hz (the SW frequency is set to 120 KHz). That is, according to the testing method of this embodiment, the same effect as achieved by carrying out the frequency characteristic test of the related art can be substantially achieved.

Accordingly, according to the testing system of this embodiment, the electrical characteristics of the semiconductor acceleration sensors 1 containing LPF 11 can be accurately tested without vibrating the semiconductor acceleration sensor 1 at a high frequency (for example, 200 Hz or more) at which it is difficult to apply acceleration stably.

Furthermore, the characteristic (cut-off frequency of 400 Hz) in which little attenuation occurs in the vibration frequency component and the characteristic in which the cut-off frequency (50 Hz) is equal to the vibration frequency are set as the filter characteristic of SCF 15 set when the test is carried out, whereby the gain in the pass band and the gain at the cut-off frequency can be observed. Therefore, required minimum test results can be achieved by using at least the two filter characteristics described above, and thus the test can be efficiently performed.

In addition, according to this embodiment, the number of the kinds of the filter characteristics thus set is increased, and the four kinds of filter characteristics containing the above two kinds of filter characteristics are set to observe the gains under the respective four kinds of filter characteristics. Therefore, the test results can be achieved with higher precision with keeping the efficiency of the test at maximum, and the reliability of the semiconductor acceleration sensor 1 can be enhanced.

Furthermore, the filter characteristic (the cut-off frequency of 400 Hz) in which little attenuation occurs in the vibration frequency component is set when the semiconductor acceleration sensor 1 is actually mounted and used in a vehicle or the like, and thus the test is carried out when the semiconductor acceleration sensor 1 is actually used, so that the test can be performed with higher reliability.

Furthermore, according to this embodiment, SCF 15 whose filter characteristic can be changed is used as LPF 11, and the filter characteristic can be arbitrarily set by inputting the basic clock frequency setting instruction from the testing apparatus 2. Therefore, various filter characteristics can be set on the basis of the basis clock frequency setting instruction, and thus the test can be efficiently performed.

Here, the corresponding relationship between the constituent elements of this embodiment and the constituent elements of the present invention will be clarified. In this embodiment, SCF 15 corresponds to the filter of the present invention, the SW clocks $\Phi_1$, $\Phi_2$ correspond to the characteristic setting signals of the present invention, and each of the transistors T1 to T8 corresponds to the semiconductor switching element of the present invention. Furthermore, the basic clock generator 17 and the switching clock generator 16 constitute the signal generating unit of the present invention (seventh aspect).

[Second Embodiment]

In the first embodiment described above, the filter characteristic of SCF 15 can be set (varied) to plural kinds of filter characteristics in accordance with the basic clock frequency setting instruction from the testing apparatus 2. According to this embodiment, an internal sequence for successively setting SCF to plural kinds of filter characteristics required for the test is equipped in LPF, and the filter characteristic is successively switched by merely inputting an internal sequence switching signal instructing the start of the test from the testing apparatus.

That is, the testing system of this embodiment is different from the testing system of the first embodiment only in the basic clock generator 32 in the semiconductor acceleration sensor 30 and the input portion 41 and the controller 42 in the testing apparatus 40. Therefore, the same constituent elements as the first embodiment are represented by the same reference numerals, and only the differences between the first and second embodiment will be mainly described.

A semiconductor acceleration sensor 30 of the second embodiment is equipped with a clock switching sequence portion 33 in a basic clock generator 32 constituting the LPF 31. The clock switching sequence portion 33 is installed with a sequence in advance so that the basic clocks $\Phi_0$ corresponding to the same four kinds of filter characteristics as SCF 15 of the first embodiment are successively generated from the basic clock generator 32.

That is, when the operation is started upon reception of an instruction (internal sequence switching signal: corresponding to the instruction of the sixth aspect of the present invention), a basic clock $\Phi_0$ for setting the cut-off frequency of SCF 15 to 400 Hz is first generated. After a predetermined time elapses, a basic clock $\Phi_0$ for setting the cut-off frequency of SCF 15 to 200 Hz is generated. Furthermore, after a predetermined time elapses, a basic clock $\Phi_0$ for setting the cut-off frequency of SCF 15 to 100 Hz is generated, and after a predetermined time elapses, a basic clock $\Phi_0$ for setting the cut-off frequency of SCF 15 to 50 Hz is generated.

As described above, according to this embodiment, the filter characteristic to be set at the testing time is predetermined in accordance with the clock switching sequence portion 33, and thus it is not required to input the type of the filter characteristic for the test one by one to the testing apparatus 40 as in the case of the first embodiment. Therefore, only parameters such as acceleration to be applied, a vibration frequency, etc. may be input to the input portion 41 when the test is carried out.

By turning on a test starting switch (not shown) equipped to the input portion 41, the controller 42 outputs an internal sequence switching instruction (for example, a one-shot pulse signal of predetermined level) to operate the clock switching sequence portion 33, and successively achieves a sensor signal under each of the four kinds of filter characteristics.

Figure 8:
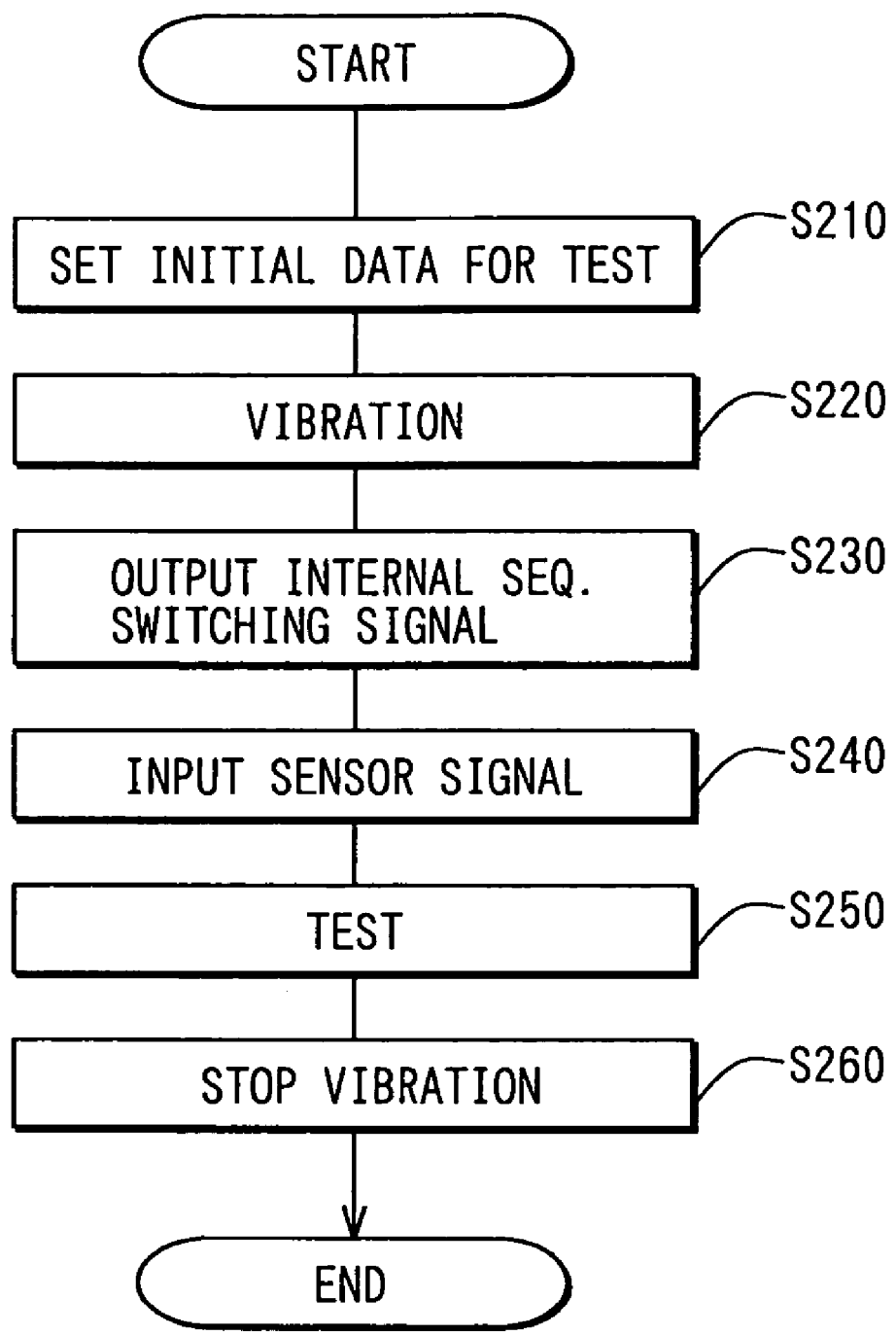
FIG. 8 is a flowchart showing the test control processing of the second embodiment.

Next, the operation of the testing apparatus 40, that is, the operation of inputting the internal sequence switching signal to the semiconductor acceleration sensor 30 as a test target and carrying out various kinds of processing/judgment on the basis of the sensor signal under each filter characteristic will be described with reference to FIG. 8. FIG. 8 is a flowchart showing the test control processing executed by the controller 42.

When the initial data such as the acceleration to be applied, the vibration frequency, etc. required to carry out the test are input to the input portion 41 and the processing is started, in step S210 various kinds of initialization such as preparation of the output of the internal sequence switching signal, preparation of the operation of the vibrating portion 23/the data processor 24, etc. are carried out on the basis of the initial data thus input. In subsequent S220, the semiconductor acceleration sensor 30 is vibrated at 50 Hz to apply the acceleration set as the initial data to the semiconductor acceleration sensor 30, and the internal sequence switching signal is output to the semiconductor acceleration sensor 30 in S230.

Accordingly, since the filter characteristic of SCF 15 is successively switched at a predetermined time interval in the semiconductor acceleration sensor 30 as described above, the sensor signal is taken in every filter characteristic (S240) and the various kinds of processing/judgment are carried out on the basis of the sensor signal (S250). The test of S250 is identical to that in S150 of FIG. 6 (first embodiment). When the sensor signal taking operation and the testing operation for all filter characteristics is completed, the vibration of the semiconductor acceleration sensor 30 is stopped, and the overall test is finished.

According to the testing system of this embodiment described above, the same action and effect as the testing system according to the first embodiment can be achieved. In addition, the four kinds of filter characteristics to be set for the test are predetermined at the semiconductor acceleration sensor 30 side. Therefore, only the internal sequence switching signal indicating the start of the test is merely output from the testing apparatus 40, and thus the test can be more efficiently carried out.

In this embodiment, the clock switching sequence portion 33 corresponds to the sequence setting unit of the present invention. Furthermore, the basic clock generator 32 and the switching clock generator 16 constitute the signal generating unit of the present invention (eighth aspect).

[Modifications]

The present invention is not limited to the above embodiments, and various kinds of modifications may be made without departing from the subject matter of the present invention.

For example, in the first embodiment, the basic clock frequency setting instruction is input from the testing apparatus 2 to the semiconductor acceleration sensor 1 to generate the basic clock $\Phi_0$ corresponding to the instruction, however, the SW clocks $\Phi_1$, $\Phi_2$ may be directly varied without varying the basic clock $\Phi_0$.

Figure 9:
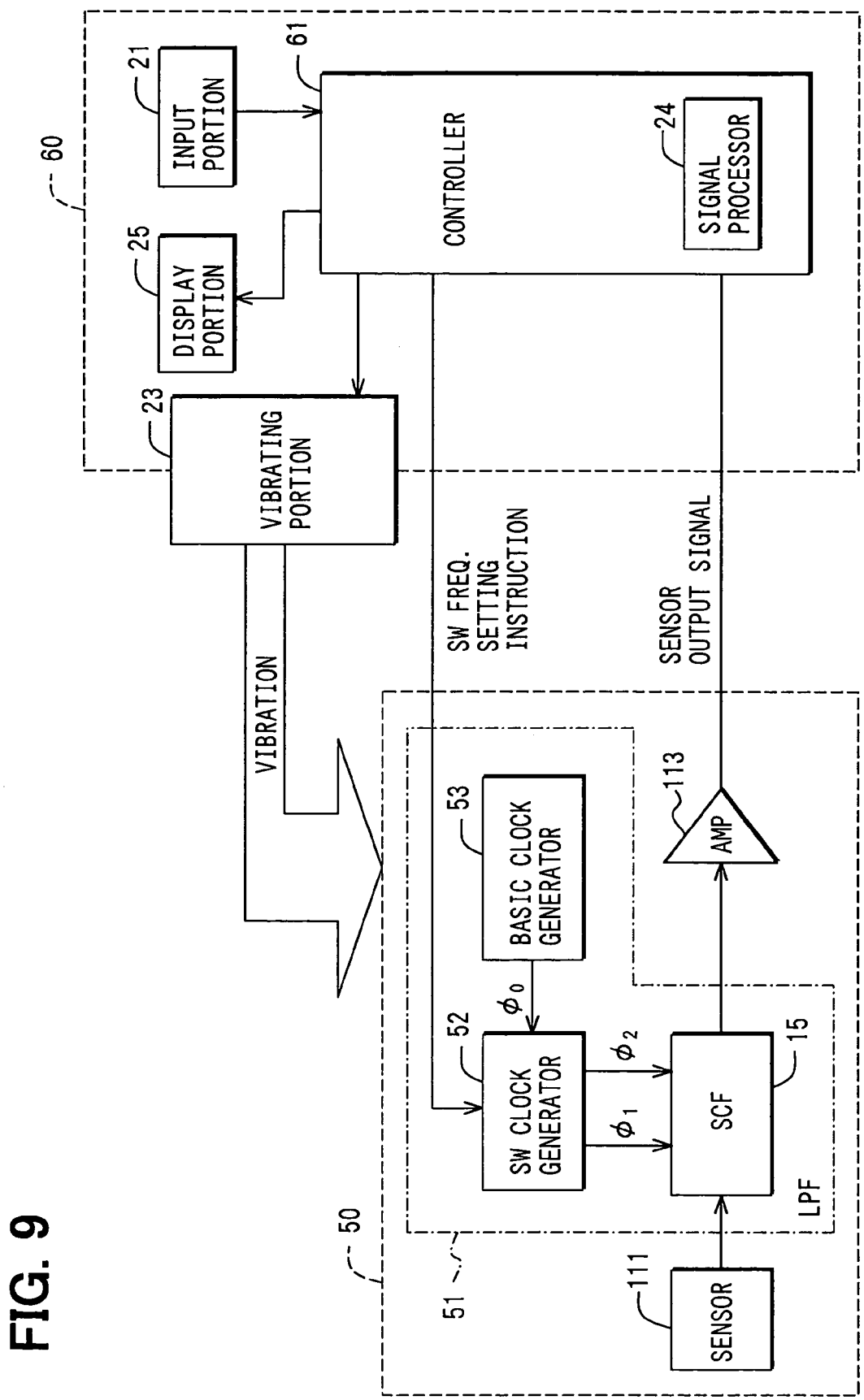
FIG. 9 is a diagram showing a modification of the test system according to the first embodiment.

That is, the basic clock $\Phi_0$ having a preset frequency is output from the basic clock generator 53 as in the case of the testing system shown in FIG. 9. Furthermore, an SW frequency setting instruction (the data indicating the frequencies of the SW clocks $\Phi_1$, $\Phi_2$) for setting the frequencies of the SW clocks $\Phi_1$, $\Phi_2$ to desired values is input from the controller 61 equipped in the testing apparatus 60 to the switching clock generator 52. The switching clock generator 52 generates the SW clocks $\Phi_1$, $\Phi_2$ having the desired frequencies according to the SW frequency setting instruction.

Accordingly, SCF 15 can be set to plural kinds of filter characteristics (in the above case, four kinds) as in the case of the first embodiment described above. Accordingly, the same effect as the first embodiment can be also achieved by the testing system which is designed so that the SW frequency is directly varied on the basis of the instruction from the external testing apparatus 60 as shown in FIG. 9.

Furthermore, in the second embodiment, the clock switching sequence portion 33 is equipped in the basic clock generator 32. However, the clock switching sequence portion 33 may be independently equipped separately from the basic clock generator 32 or equipped in a switching clock generator 72 as shown in FIG. 10, for example.

Figure 10:
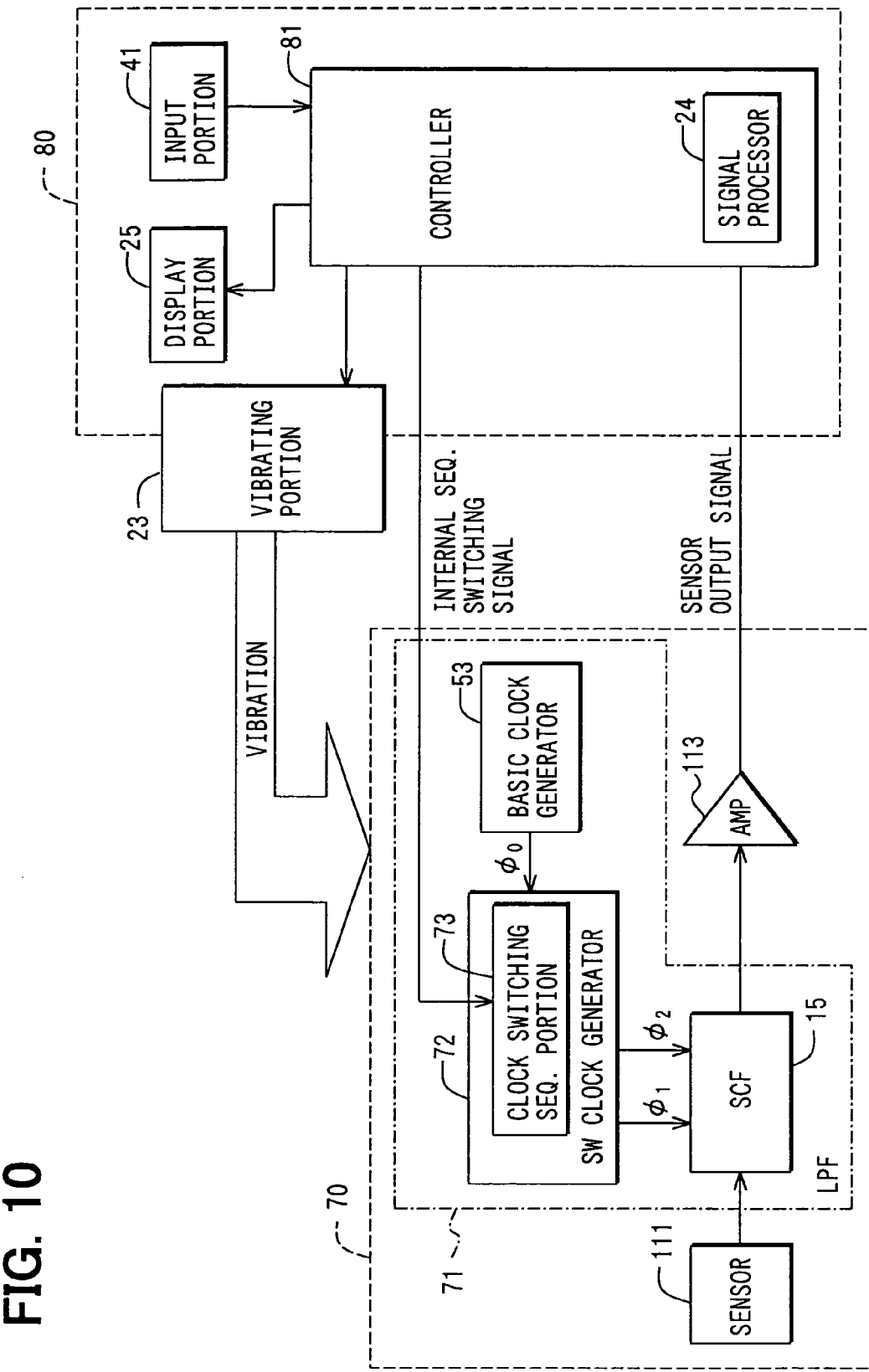
FIG. 10 is a diagram showing a modification of the testing system according to the second embodiment.

That is, as shown in FIG. 10, the clock switching sequence portion 73 is equipped in the switching clock generator 72, and the internal sequence switching signal is input from a controller 81 in a testing apparatus 80 to the clock switching sequence portion 73. Upon receiving the internal sequence switching signal, the clock switching sequence portion 73 is operated to vary the SW clocks $\Phi_1$, $\Phi_2$ in a preset order and thus change the filter characteristic of SCF 15 to desired characteristics (four kinds in the above case). The same effect as the second embodiment can be also achieved even when the SW clocks $\Phi_1$, $\Phi_2$ are varied by the clock switching sequence portion 73 as described above.

Furthermore, in the testing system of the first embodiment and the testing system described with reference to FIG. 9, the instruction for varying the basic clock frequency or the SW frequency (actually, the data indicating the frequency) is input from the testing apparatus. However, not the instruction, but the SW clocks $\Phi_1$, $\Phi_2$ themselves may be directly input to SCF 15, for example, as shown in FIG. 11.

Figure 11:
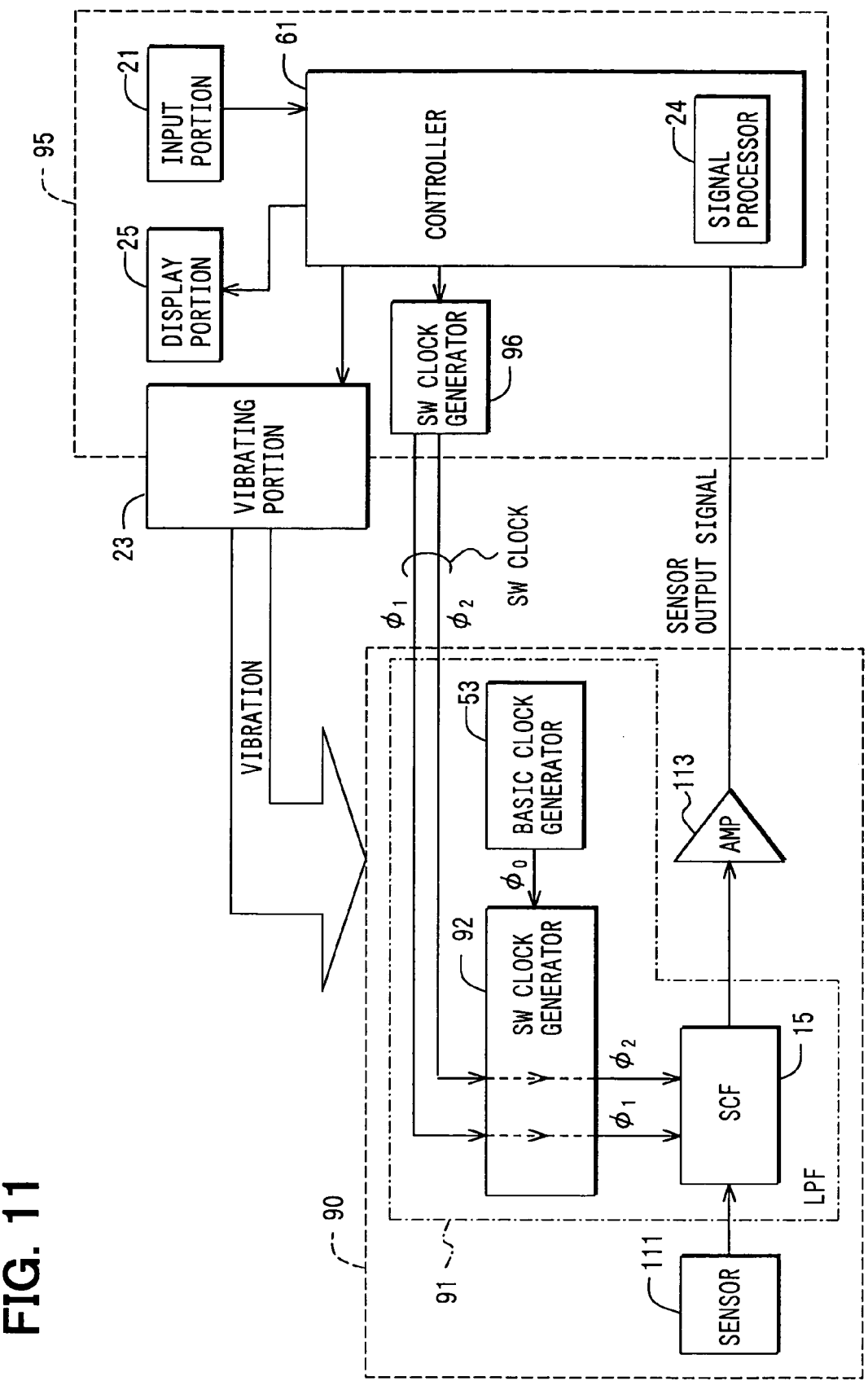
FIG. 11 is a diagram showing a modification of the testing system according to the first embodiment.

In the system of FIG. 11, an SW clock generator 96 for generating the SW clocks $\Phi_1$, $\Phi_2$ is equipped in the testing apparatus 95, and SW clocks having predetermined frequencies are generated/output according to an instruction from a controller 61. In FIG. 11, the SW clocks are passed through the switching clock generator 92 and input to SCF 15. However, the SW clocks may be directly input to SCF 15 without being passed through the switching clock generator 92 or the like.

In FIG. 11, the SW clocks $\Phi_1$, $\Phi_2$ generated in the testing apparatus 95 are input to SCF 15. However, the basic clock $\Phi_0$ may be generated in the testing apparatus 95 and then directly input to the switching clock generator 92.

Furthermore, in the first embodiment, the specific example of the basic clock frequency setting instruction is the data indicating the basic clock frequency. However, the present invention is not limited to this mode, and it may be the voltage signal corresponding to the basic clock (and thus corresponding to the plural kinds of filter characteristics). That is, a voltage signal which is normally kept under an open state (0V), but varied to 2V, 4V, 6V, etc. under the test is applied, and the basic clock $\Phi_0$ having the frequency corresponding to each voltage is generated.

Still furthermore, in the second embodiment, only the internal sequence switching signal is input at the start time of the test, and subsequently the filter characteristic is successively switched by the operation of the clock switching sequence portion 33. However, the present invention is not limited to this mode, and the filter characteristic may be switched one by one every time the internal sequence switching signal is input. That is, for example, when the internal sequence switching signal is first input, the cut-off frequency of SCF 15 is set to 400 Hz, and then when the internal sequence switching signal is input again, the cut-off frequency is set to 200 Hz. That is, the filter characteristic is varied in the preset order every time the internal sequence switching signal is input.

Figure 12:
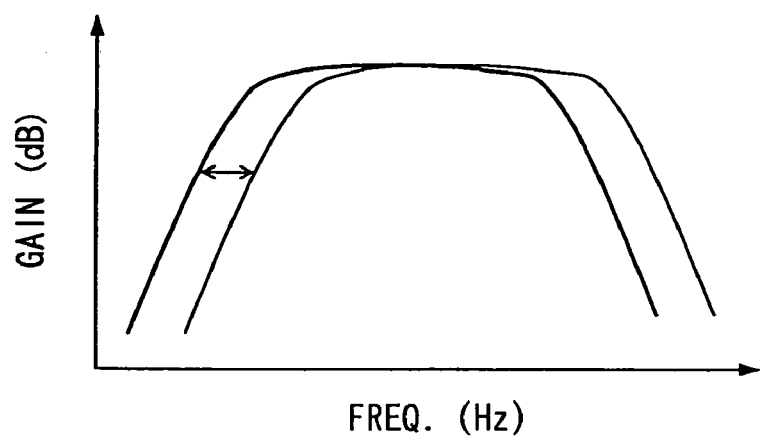
FIG. 12 is a graph showing the frequency characteristic when a band pass filter is constructed by SCF.
Figure 13:
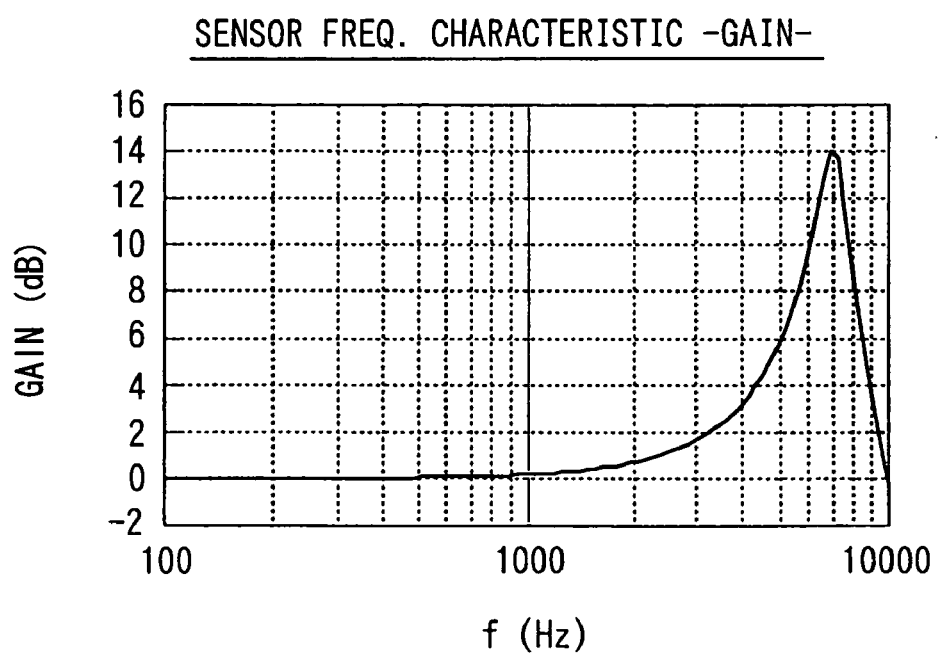
FIG. 13 is a graph showing the frequency characteristic (gain characteristic) of a sensor element.

Still furthermore, in the above embodiments, a LPF is contained in the semiconductor acceleration sensor. However, this mode may be applicable in the case of other filters such as a band pass filter, a high pass filter, etc. For example, when a band pass filter is constructed by using SCF, the frequency characteristic thereof can be varied by varying the SW frequency as shown in FIG. 12. Therefore, the vibration frequency is fixed and the filter characteristic of the band pass filter is varied, whereby the same effect as each embodiment described above can be achieved.

Furthermore, in each of the above-described embodiments, four kinds of filter characteristics of SCF 15 are set. However, the number of the kinds of the filter characteristics may be increased or reduced. However, it is preferable to carry out the test for at least two kinds of filter characteristics, that is, the filter characteristic in which the attenuation amount of the vibration frequency component is substantially zero (that is, the filter characteristic when the SW frequency is equal to 120 KHz), and the filter characteristic in which the cut-off frequency is equal to the vibration frequency (that is, the filter characteristic when the SW frequency is equal to 15 KHz).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of testing electrical characteristics of a semiconductor acceleration sensor including a semiconductor sensor element for outputting an electrical signal in connection with acceleration, and a filter for passing a preset frequency band component out of the electrical signal therethrough, the semiconductor sensor element and the filter being mounted in a package, the filter characteristic of the filter being set in accordance with a signal from the outside of the filter, and the electrical signal passed through the filter being output as a sensor signal, the method comprising:

vibrating the semiconductor acceleration sensor at a preset vibration frequency so that a predetermined fixed acceleration is applied to the semiconductor acceleration sensor;

varying a characteristic setting signal for setting the filter characteristic to change the filter characteristic to plural kinds under the state that the fixed acceleration is applied to the semiconductor acceleration sensor; and judging on the basis of the sensor signal achieved under each of the plural kinds of filter characteristics whether the semiconductor acceleration sensor is normal or not.

2. The method according to claim 1, wherein an instruction for generating the characteristic setting signal corresponding to each of the plural kinds of filter characteristics is input from the external to the semiconductor acceleration sensor every characteristic setting signal and the characteristic setting signal is generated in accordance with the instruction thus input, thereby changing the filter characteristic to the plural kinds.

3. The method according to claim 1, wherein an instruction for successively generating the characteristic setting signal corresponding to each of the plural kinds of filter characteristics is input from the external to the semiconductor acceleration sensor to sequentially vary the filter characteristic to the plural kinds.

4. A method of testing electrical characteristics of a semiconductor acceleration sensor including a semiconductor sensor element for outputting an electrical signal in connection with acceleration, and a filter for passing a preset frequency band component out of the electrical signal therethrough, the semiconductor sensor element and the filter being mounted in a package, the filter characteristic of the filter being set in accordance with a signal from the outside of the filter, and the electrical signal passed through the filter being output as a sensor signal, the method comprising:

vibrating the semiconductor acceleration sensor at a preset vibration frequency so that a predetermined acceleration is applied to the semiconductor acceleration sensor;

varying a characteristic setting signal for setting the filter characteristic to change the filter characteristic to plural kinds under the state that the acceleration is applied to the semiconductor acceleration sensor; and judging on the basis of the sensor signal achieved under each of the plural kinds of filter characteristics whether the semiconductor acceleration sensor is normal or not, wherein when the gain of the sensor signal achieved under each of the plural kinds of filter characteristics is within a predetermined specific range containing a theoretical value of the gain of the sensor signal in the corresponding filter characteristic, it is judged that the semiconductor acceleration sensor is normal.

5. A method of testing electrical characteristics of a semiconductor acceleration sensor including a semiconductor sensor element for outputting an electrical signal in connection with acceleration, and a filter for passing a preset frequency band component out of the electrical signal therethrough, the semiconductor sensor element and the filter being mounted in a package, the filter characteristic of the filter being set in accordance with a signal from the outside of the filter, and the electrical signal passed through the filter being output as a sensor signal, the method comprising:

vibrating the semiconductor acceleration sensor at a preset vibration frequency so that a predetermined acceleration is applied to the semiconductor acceleration sensor;

varying a characteristic setting signal for setting the filter characteristic to change the filter characteristic to plural kinds under the state that the acceleration is applied to the semiconductor acceleration sensor; and judging on the basis of the sensor signal achieved under each of the plural kinds of filter characteristics whether the semiconductor acceleration sensor is normal or not, wherein the plural kinds of filter characteristics contain at least a first filter characteristic in which the attenuation amount of the vibration frequency component to an input signal is substantially equal to zero, and a second filter characteristic in which the cut-off frequency is equal to the vibration frequency.

6. The method according to claim 5, wherein the first filter characteristic is identical to a filter characteristic set when the semiconductor acceleration sensor is actually used.

* * * * *